United States Patent
Pang

(10) Patent No.: US 10,611,261 B2
(45) Date of Patent: Apr. 7, 2020

(54) VEHICLE CONTROLLED BY REMOTE CONTROLLER AND POSTURE

(71) Applicant: Walnut Technology Limited, Hong Kong (CN)

(72) Inventor: Yik Hang Pang, Hong Kong (CN)

(73) Assignee: WALNUT TECHNOLOGY LIMITED, Hong Kong (CN)

( * ) Notice: Subject to any disclaimer, the term of this patent is extended or adjusted under 35 U.S.C. 154(b) by 0 days.

(21) Appl. No.: 15/982,600

(22) Filed: May 17, 2018

(65) Prior Publication Data

US 2018/0264972 A1   Sep. 20, 2018

Related U.S. Application Data

(63) Continuation-in-part of application No. PCT/EP2017/052263, filed on Feb. 2, 2017, which is a continuation of application No. 15/273,316, filed on Sep. 22, 2016.

(60) Provisional application No. 62/509,008, filed on May 19, 2017, provisional application No. 62/324,494, filed on Apr. 19, 2016.

(51) Int. Cl.
| | |
|---|---|
| *B60L 15/20* | (2006.01) |
| *A63C 17/01* | (2006.01) |
| *A63C 17/02* | (2006.01) |
| *A63C 17/12* | (2006.01) |

(52) U.S. Cl.
CPC ........ *B60L 15/2036* (2013.01); *A63C 17/011* (2013.01); *A63C 17/02* (2013.01); *A63C 17/12* (2013.01); *A63C 17/012* (2013.01); *A63C 17/015* (2013.01); *A63C 2203/12* (2013.01); *B60L 2200/24* (2013.01); *B60L 2240/12* (2013.01); *B60L 2240/14* (2013.01); *B60L 2240/32* (2013.01); *B60L 2240/423* (2013.01); *B60L 2250/00* (2013.01); *Y02T 10/7258* (2013.01)

(58) Field of Classification Search
CPC ... A63C 17/011; A63C 17/012; A63C 17/015; A63C 17/02; A63C 17/12; A63C 2203/12; B60L 15/2036; B60L 2200/24; B60L 2240/12; B60L 2240/14; B60L 2240/32; B60L 2240/423; B60L 2250/00; Y02T 10/7258

See application file for complete search history.

(56) References Cited

U.S. PATENT DOCUMENTS 5,330,026 A * 7/1994 Hsu .................. A63C 17/01
                                                    180/181
5,487,441 A * 1/1996 Endo ................ A63C 17/004
                                                    180/181

(Continued)

*Primary Examiner* — Babar Sarwar
(74) *Attorney, Agent, or Firm* — Cantor Colburn LLP

(57) ABSTRACT

Embodiments of the disclosure provide an electric vehicle and a method for controlling the electric vehicle. The electric vehicle includes at least one electric motorized wheel to drive the electric vehicle; a pressure sensor module configured to detect pressure on the electric vehicle; a communication interface configured to receive remote instructions from a remote controller; and a central controller configured to operate the at least one electric motorized wheel in a control mode based on at least one of the received remote instructions and the pressure.

25 Claims, 9 Drawing Sheets

(56) References Cited

U.S. PATENT DOCUMENTS

| | | | | |
|---|---|---|---|---|
| 5,833,252 A | * | 11/1998 | Strand | A63C 17/0033 280/87.042 |
| 5,893,425 A | * | 4/1999 | Finkle | A63C 17/01 180/180 |
| 6,050,357 A | * | 4/2000 | Staelin | A63C 17/004 180/65.1 |
| 6,302,230 B1 | * | 10/2001 | Kamen | A63C 17/01 180/171 |
| 6,585,137 B1 | * | 7/2003 | Archuleta | A45C 3/00 224/576 |
| 7,053,288 B2 | * | 5/2006 | Iwai | A63C 5/06 280/87.042 |
| 7,204,330 B1 | * | 4/2007 | Lauren | A63C 17/12 180/181 |
| D608,851 S | * | 1/2010 | Hillman | A45C 3/00 D21/765 |
| 10,058,764 B2 | * | 8/2018 | Aders | A63C 17/015 |
| 10,245,936 B2 | * | 4/2019 | Gillett | B60K 7/0007 |
| 2005/0006158 A1 | * | 1/2005 | Tsai | A63C 17/12 180/167 |
| 2005/0139406 A1 | * | 6/2005 | McLeese | A63C 17/01 180/180 |
| 2006/0213711 A1 | * | 9/2006 | Hara | A63C 17/0033 180/181 |
| 2010/0222941 A1 | * | 9/2010 | Chang | A63C 17/015 701/2 |
| 2013/0081891 A1 | * | 4/2013 | Ulmen | A63C 17/12 180/181 |
| 2013/0206493 A1 | * | 8/2013 | Larson | A63C 17/12 180/181 |
| 2015/0175031 A1 | * | 6/2015 | Henderson | B60L 13/04 180/65.8 |
| 2015/0306514 A1 | * | 10/2015 | Mimlitch, III | A63H 17/00 446/454 |
| 2016/0014252 A1 | * | 1/2016 | Biderman | B60L 15/20 455/420 |
| 2017/0106739 A1 | * | 4/2017 | Gillett | B60K 7/0007 |
| 2017/0252638 A1 | * | 9/2017 | Ulmen | A63C 17/12 |
| 2018/0264972 A1 | * | 9/2018 | Pang | A63C 17/011 |

* cited by examiner

VEHICLE CONTROLLED BY REMOTE CONTROLLER AND POSTURE

CROSS-REFERENCE TO RELATED APPLICATIONS

The present application is a continuation-in-part of International Application Number PCT/EP2017/052263, filed Feb. 2, 2017, which claims priority to U.S. Non-provisional application Ser. No. 15/273,316, filed Sep. 22, 2016, which claims priority to U.S. Provisional Application No. 62/324,494, filed Apr. 19, 2016. The present application also claims priority to U.S. Provisional Application No. 62/509,008, filed May 19, 2017. The contents of the above-referenced applications are expressly incorporated herein by reference in their entireties.

BACKGROUND

Although modern public transportation including bus, subway, light rail, taxi, etc., has greatly improved people's mobility, it still lacks effective means to cover short distance transportation, e.g., the last mile to a destination. Electric vehicles, such as a remote controlled scooter, an electrical solowheel, a mini electrical motorbike, or the like, offer a convenient solution for short distance transportation, e.g., transportation within a distance of a few miles.

SUMMARY

Embodiments of the disclosure provide an electric vehicle. The electric vehicle can include: at least one electric motorized wheel to drive the electric vehicle; a pressure sensor module configured to detect pressure on the electric vehicle; a communication interface configured to receive remote instructions from a remote controller; and a central controller configured to operate the at least one electric motorized wheel in a control mode based on at least one of the received remote instructions and the pressure.

Embodiments of the disclosure provide a method for controlling an electric vehicle including at least one electric motorized wheel. The method can include: detecting pressure on the electric vehicle; receiving remote instructions from a remote controller; and operating the at least one electric motorized wheel in a control mode based on at least one of the received remote instructions and the pressure.

Embodiments of the disclosure further provide a non-transitory computer-readable medium that stores a set of instructions. When executed by at least one processor of an electronic device, the set of instructions can cause the electronic device to perform a method for controlling an electric vehicle including at least one electric motorized wheel. The method can include: detecting pressure on the electric vehicle; receiving remote instructions from a remote controller; and operating the at least one electric motorized wheel in a control mode based on at least one of the received remote instructions and the pressure.

DETAILED DESCRIPTION

Sensor controlled vehicles (SCVs) and remote controlled vehicles are designed for the short distance transportation. The SCVs, such as two-wheel SCVs and self-balanced solowheels, may adjust movements based on users' postures. However, the SCVs are difficult to manipulate. For example, the SCVs are difficult to slow down, and therefore have safety issues.

On the other hand, the remote controlled vehicles, such as wireless controlled electrical scooters, often cannot be controlled by body movements (e.g., inclining, bending, or the like), and therefore the remote controlled vehicles cannot be controlled by instinct of the user. Moreover, a remote controlled vehicle can only be controlled by corresponding operations on a remote controller, and misoperations on the remote controller may happen and cause unwanted movement of the vehicle. Further, when the remote controller is lost or not functioning properly, the vehicle cannot be used anymore. It is also dangerous if the wireless connection between the remote controller and the vehicle is not stable, as the user may lose the control of the vehicle.

Figure 1A:
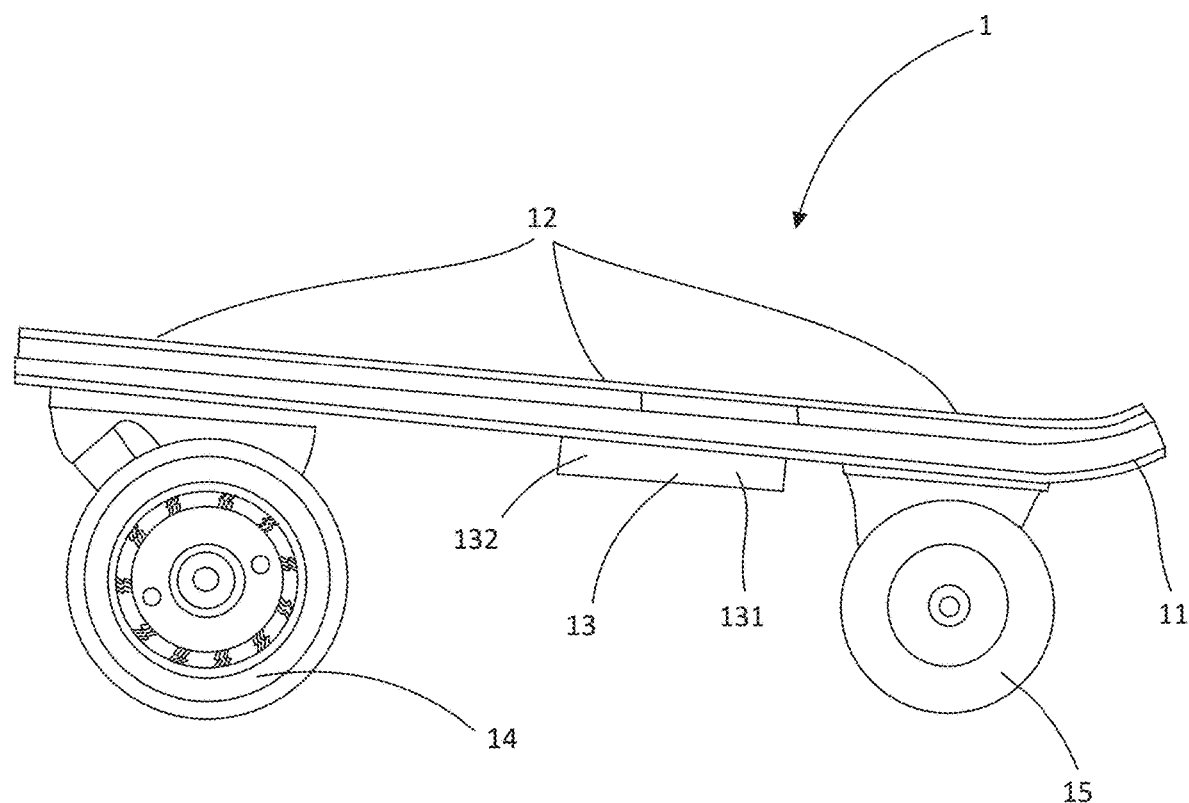
FIG. 1A is a schematic diagram illustrating an exemplary electric vehicle, consistent with embodiments of the present disclosure.

FIG. 1A illustrates an exemplary electric vehicle 1, according to embodiments of the disclosure.

As shown in FIG. 1A, electric vehicle 1 may include, for example, a main body 11, a pressure sensor module 12, a central control unit 13, and at least one electric motorized wheel 14.

Figure 2A:
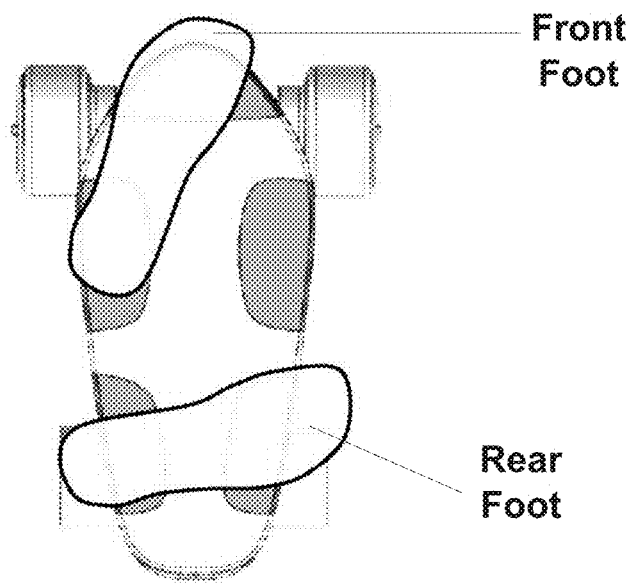
FIGS. 2A-2B are schematic diagrams illustrating exemplary placement of feet on the electric vehicle, consistent with embodiments of the present disclosure.
Figure 2B:
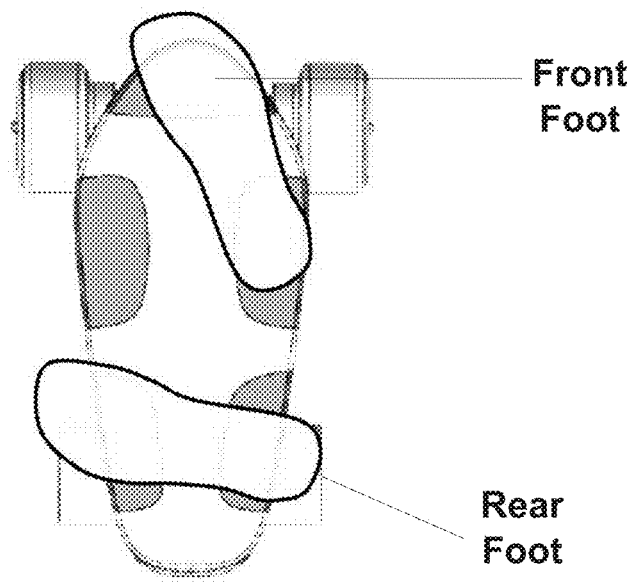

Main body 11 provides a surface for a user to place feet or cargo on electric vehicle 1. FIGS. 2A-2B are schematic diagrams illustrating exemplary placement of feet on the electric vehicle, according to some embodiments of the disclosure. As shown in FIGS. 2A-2B, the feet of the user can be placed on various areas of the surface of main body 11.

Referring back to FIG. 1A, other than electric motorized wheel 14, electric vehicle 1 may further include a driven wheel 15. Furthermore, the wheels of electric vehicle 1 can be, for example, hub-motor driven wheels, gear-motor driven wheels, or belt-motor driven wheels, etc. It is appreciated that electric motorized wheel 14 may include a pair of electric motorized wheels disposed at both sides of main body 11. One or more electric motorized wheel of each side can be adjusted independently, so that the two sides can have different speeds. By independently changing speed of wheels at different sides, the course of electric vehicle 1 can be controlled. It is appreciated that at least one electric motorized wheel 14 can be driven by a main battery installed at, for example, main body 11.

Figure 3A:
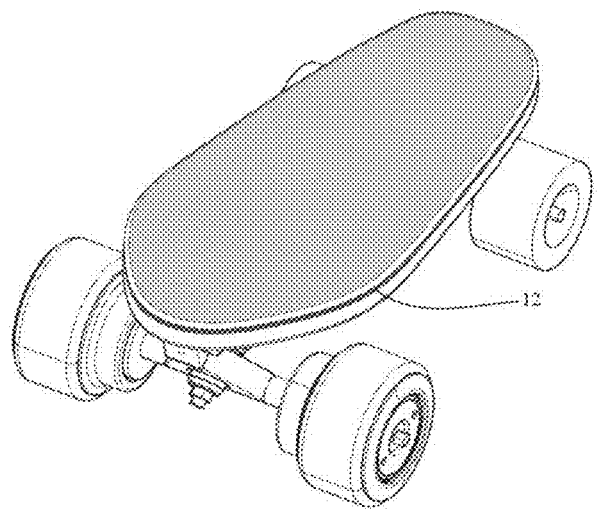
FIGS. 3A-3C are schematic diagrams illustrating sensing areas of a pressure sensor module, consistent with embodiments of the present disclosure.
Figure 3B:
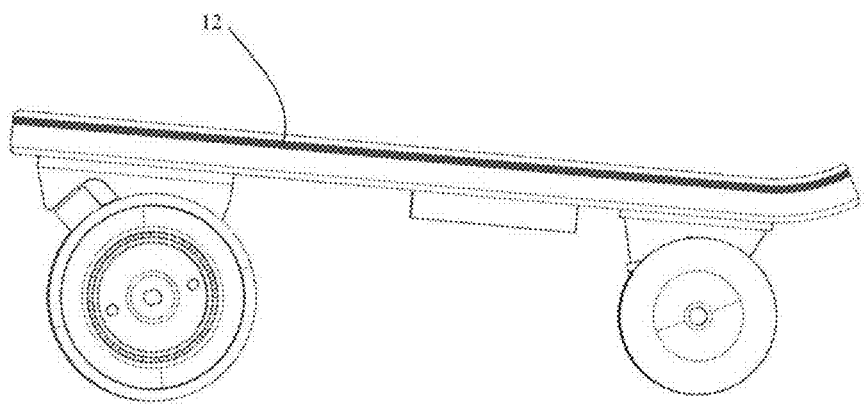
Figure 3C:
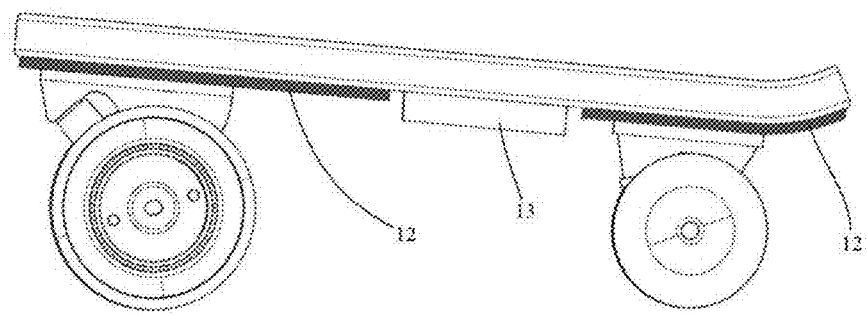

Pressure sensor module 12 may be disposed on various areas of main body 11. For example, pressure sensor module 12 may be installed on, within or beneath main body 11, or in other places of main body 11. FIGS. 3A-3C are schematic diagrams illustrating sensing areas of a pressure sensor module, according to exemplary embodiments of the disclosure. In some embodiments, as shown in FIG. 3A, the sensing area of pressure sensor module 12 may cover the entire surface of main body 11. In some embodiments, as shown in FIG. 1A, pressure sensor module 12 may be placed on the top surface of main body 11 to directly bear the force, while in some other embodiments, as shown in FIG. 3B, pressure sensor model 12 is embedded in main body 11. In other words, pressure sensor module 12 can be disposed beneath the top surface of main body 11. For example, the top surface of main body 11 can include a protective layer, so that pressure sensor module 12 can be protected from external damage, such as puncture. Moreover, pressure sensor module 12 may also be embedded in main body 11 as an interlayer for more effective protection. In some embodiments, as shown in FIG. 3C, pressure sensor module 12 may be installed at the bottom of main body 11 to simplify the electrical connection and avoid perforations through main body 11. Pressure sensor module 12 may include one or more pressure sensors configured to detect a pressure or force received at predetermined locations of the top surface of vehicle 1. The pressure sensors can be in various numbers, types, or shapes. For example, in some embodiments, pressure sensor module 12 may be a thin layer of electrical pressure sensing units with force sensing resistance or force sensing electric capacity. Pressure sensor module 12 can detect a user's pressure indication, caused by a change of the user's pressure on the vehicle surface or a change of the gravity center of the user's body. The user's pressure indication may include, for example, pressing forward, backward, left, or right. The pressure indication may be transmitted to central control unit 13.

In some embodiments, pressure sensor module 12 may not have to cover an entire surface of main body 11. For example, with reference back to FIGS. 2A-2B, pressure sensor module 12 may include a first sensing area installed with one or more pressure sensors to detect the pressure of the user's front foot, and a second sensing area installed with one or more pressure sensors to detect the pressure of the user's rear foot.

In some embodiments, the first sensing area of pressure sensor module 12 may be further divided into a first sub-area installed with one or more pressure sensors to detect the front-part pressure of the front foot, a second sub-area installed with one or more pressure sensors to detect the left-side pressure of the front foot, and a third sub-area installed with one or more pressure sensors to detect the right-side pressure of the front foot. In some embodiments, the second sensing area of pressure sensor module 12 may be further divided into a fourth sub-area installed with one or more pressure sensors to detect the left-side pressure of the rear foot, and a fifth sub-area installed with one or more pressure sensors to detect the right-side pressure of the rear foot.

With reference back to FIG. 1A, central control unit 13 may be used for controlling operations and movements of electric vehicle 1. In some embodiments, central control unit 13 may include a positioning sub-unit 131 and a communication interface 132. Although FIG. 1A shows that communication interface 132 is integrated into central control unit 13, it is contemplated that communication interface 132 can be an independent component provided separately from central control unit 13.

Figure 1B:
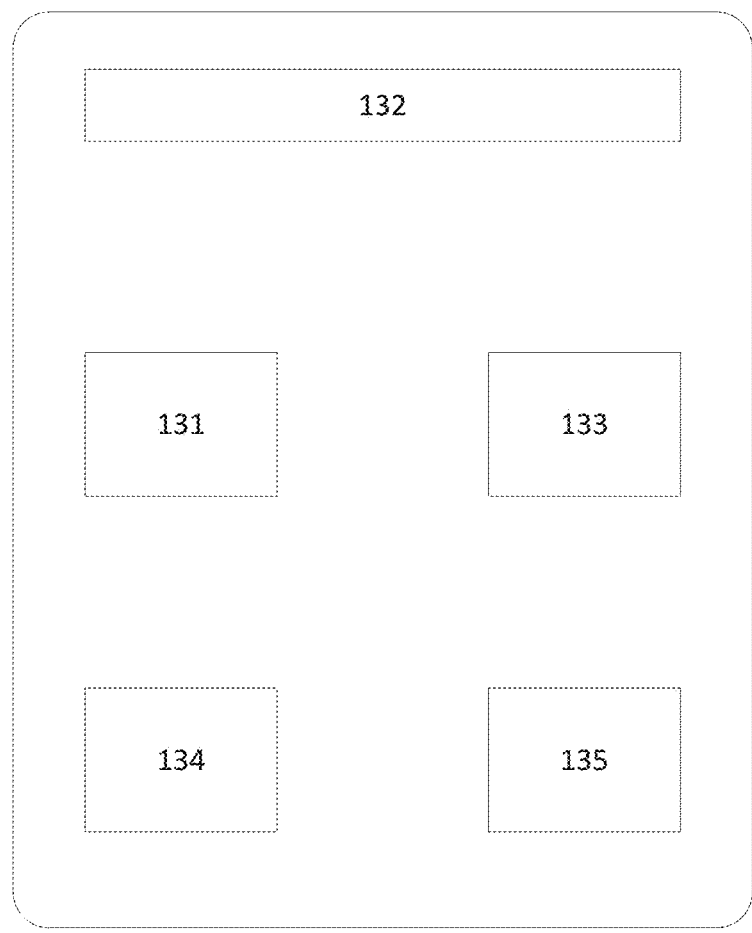
FIG. 1B is a block diagram of a central control unit, consistent with embodiments of the present disclosure.

FIG. 1B is a block diagram of a central control unit 13, according to exemplary embodiments of the present disclosure. As shown in FIG. 1B, central control unit 13 can include a positioning sub-unit 131, a communication interface 132, a power sub-unit 133, a processing sub-unit 134, and a buffer sub-unit 135.

Positioning unit 131 may determine a position of electric vehicle 1. In one embodiment, positioning unit 131 may determine the position of electric vehicle 1 according to at least one of Global Positioning System (GPS) signals, Wireless Fidelity (WiFi) signals, Bluetooth signals, or the like. Positioning unit 131 may further determine a distance between electric vehicle 1 and a remote controller, which will be described in detail with reference to FIG. 4. In some embodiments, positioning unit 131 may determine the distance by receiving the determined position of electric vehicle 1 and a position of the remote controller, and then determine the distance based on the determined position of electric vehicle 1 and position of the remote controller. In some embodiments, positioning unit 131 may determine the distance by measuring a signal strength of a wireless connection established between electric vehicle 1 and the remote controller. For example, when the connection between electric vehicle 1 and the remote controller is established via Bluetooth signal, positioning unit 131 may estimate the distance by measuring a signal strength of the Bluetooth signal.

Communication interface 132 may establish a communication session with a remote controller for receiving remote instructions, and send received remote instructions to central control unit 13 for further execution. The communication session may be established via wireless communication, such as Bluetooth, WLAN, radio frequency communication, or the like. Communication interface 132 may also inform central control unit 13 about the status of the communication session. For example, communication interface 132 may periodically determine whether the communication between communication interface 132 and the remote controller operates properly, and keep central control unit 13 updated of such status information.

Power sub-unit 133 can include a battery to provide electric power to central control unit 13. It is appreciated that central control unit 13 can also be powered by the main battery installed at main body 1.

Processing sub-unit 134 can process signals or data and generate commands for controlling electric vehicle 1. Processing sub-unit 134 may be a general-purpose processor including a Central Processing Unit (CPU), a Network Processor (NP), or the like, and may also be a Digital Signal Processor (DSP), an Application Specific Integrated Circuit (ASIC), a Field-Programmable Gate Array (FPGA) or another programmable logic device, a discrete gate, a transistor logic device, or a discrete hardware component.

Buffer sub-unit 135 can include an internal memory, such as a high-speed Random Access Memory (RAM), and may further include a non-volatile memory, such as at least one magnetic disk memory.

Figure 4:
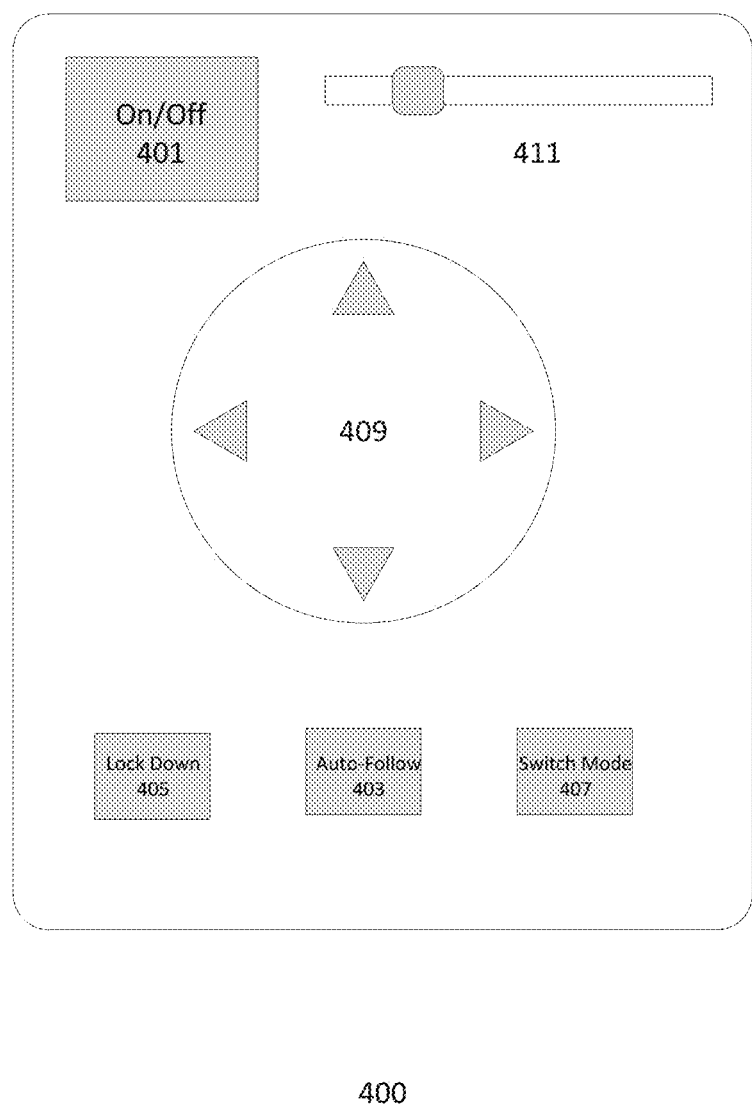
FIG. 4 is a schematic diagram illustrating an exemplary remote controller, consistent with embodiments of the present disclosure.

FIG. 4 is a schematic diagram illustrating a remote controller 400, according to exemplary embodiments of the present disclosure.

In some embodiments, remote controller 400 may send a remote instruction to electric vehicle 1 via communication interface 132 (FIG. 1). The remote instruction may be an instruction switching electric vehicle 1 to a remote control mode or a posture control mode, or an instruction for electric vehicle 1 to perform an action such as moving forward, speeding up, moving backward, slowing down, turning left, turning right, or the like. Remote controller 400 can be a remote device, a smart device, or the like. For example, as shown in FIG. 4, remote controller 400 may include buttons 401-411 for turning on/off electric vehicle 1, moving forward/speeding up, moving backward/slowing down, turning left, turning right, locking down, auto-follow, switching a control mode, or the like.

For example, when a user presses "On/Off" button 401 on remote controller 400, remote controller 400 sends a remote instruction to electric vehicle 1 for turning on or off the vehicle accordingly. "Auto-Follow" button 403 may be used to instruct the vehicle to automatically follow remote controller 400 by a predetermined distance (e.g., 2 meters). As described before, with the help of positioning unit 131, positions of electric vehicle 1 and remote controller 400 and a distance therebetween may be determined by, for example, GPS or the received signal strength therebetween. Therefore, with the instruction of "Auto-Follow," remote controller 400 can follow electric vehicle 1 with the predetermined distance. For safety consideration, in some embodiments, the instruction of "Auto-Follow" can be executed only if no user is standing on electric vehicle 1. "Lock Down" button 405 may be used to instruct electric vehicle 1 to lock or unlock itself. The locked vehicle may not function anymore until electric vehicle 1 is unlocked by pressing "Lock Down" button 405 again. "Switch Mode" button 407 may be used to switch electric vehicle 1 between a remote control mode and a posture control mode. In some embodiments, "Switch Mode" button 407 can include two buttons associated with remote control mode and a posture control mode, respectively. Details of switching the control mode will be discussed below. Buttons 409 of "Forward", "Backward/Slow Down", "Turn Left", and "Turn Right" may be used to control the movement direction (e.g., forward, backward, left, right, etc.) of electric vehicle 1 and/or speed up/slow down electric vehicle 1.

Remote controller 400 may further include a speed bar 411 for controlling a maximum speed for electric vehicle 1, as shown in FIG. 4. The maximum speed may be displayed on a screen of remote controller 400. The user may set a maximum speed of electric vehicle 1 for safety considerations.

In some embodiments, remote controller 400 may be a smart device, such as a smart phone, a tablet, a wearable device, or the like, having the above-described buttons or similar buttons displayed on a screen.

As discussed above, central control unit 13 may control electric vehicle 1 to operate in a control mode corresponding to the received remote instructions. The control mode may include a remote control mode and a posture control mode. In the remote control mode, electric vehicle 1 can be controlled via remote controller 400. While in the posture control mode, electric vehicle 1 can be controlled by the posture of a subject on electric vehicle 1. The subject can be a user, a cargo, or the like.

Electric vehicle 1 may be switched between the remote control mode and the posture control mode. During switching of the control mode, the acceleration of electric vehicle 1 may be automatically limited under a predetermined value for a predetermined period of time (e.g., 10 seconds) to ensure a smooth transition. For example, the acceleration of the vehicle may be limited to 0.1 m/s$^2$ for 10 seconds starting from the switching. That is, the acceleration of the vehicle is kept less than 0.1 m/s$^2$ for 10 seconds starting from the switching. Similarly, a minimum turning radius may be defined as more than 3 meters, and a maximum speed may be limited to 5 m/s. After the period of time (e.g., 10 seconds) elapses, the limitations may be removed or gradually released, allowing the acceleration, speed, or the like to reach normal settings.

Detail of controlling electric vehicle 1 will be further described as below.

Figure 5:
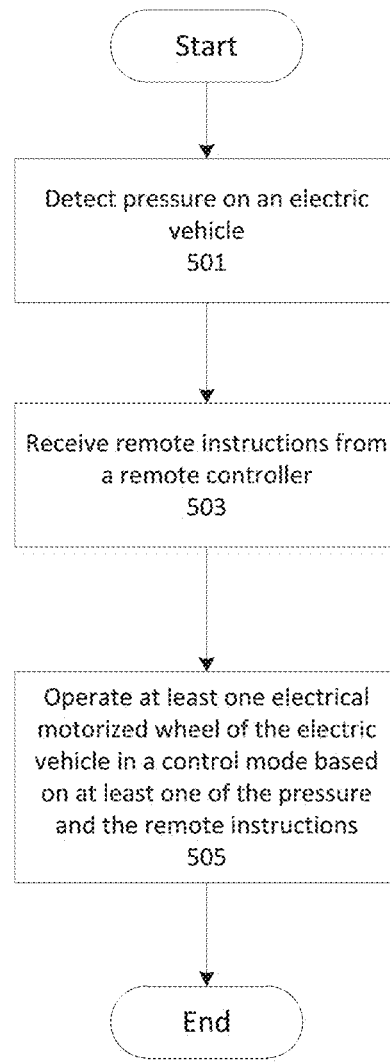
FIG. 5 is a flowchart of an exemplary method for controlling an electric vehicle, consistent with embodiments of the present disclosure.

FIG. 5 is a flowchart of an exemplary method 500 for controlling an electric vehicle, according to some embodiments of the disclosure. For example, method 500 may be used to control electric vehicle 1 (FIG. 1A). Method 500 may include steps 501-505.

In step 501, electric vehicle 1 detects pressure on electric vehicle 1 via, for example, pressure sensor module 12. In some embodiments, pressure sensor module 12 may be very sensitive to pressure change. For example, a vibration of electric vehicle, a drop of rain, and the like may also generate pressure on electric vehicle 1. To eliminate such "unintended" pressure, electric vehicle 1 may determine whether the detected pressure is greater than a predetermined value. In response to the detected pressure being greater than the predetermined value, electric vehicle 1 may further determine a type of the pressure.

Figure 6A:
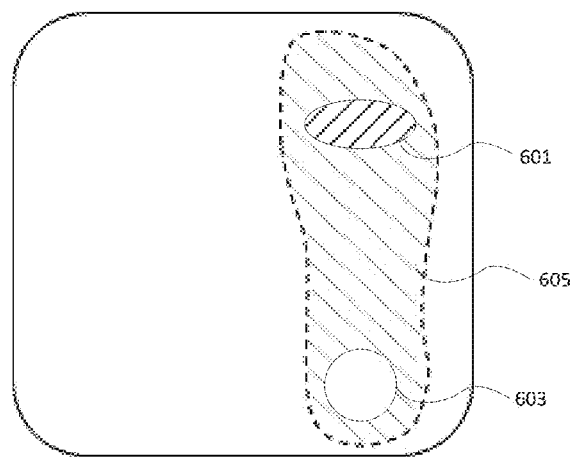
FIGS. 6A, 6B, and 6C illustrate exemplary diagrams of distributions of pressure detected by the electric vehicle, consistent with embodiments of the present disclosure.
Figure 6B:
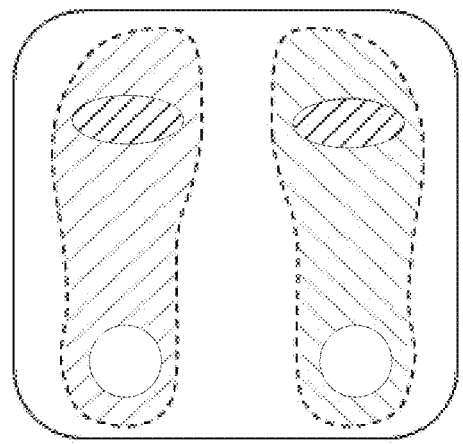
Figure 6C:
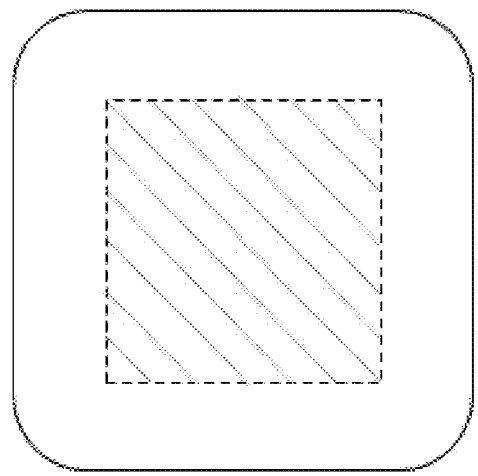

FIGS. 6A-6C are schematic diagrams illustrating exemplary distributions of pressure on electric vehicle 1, according to embodiments of the disclosure.

As discussed above, pressure sensor module 12 can include a plurality of areas to sense pressure. Therefore, pressure sensor module 12 can determine a distribution of pressure on electric vehicle 1 based on signals fed back from the plurality of areas. Typically, electric vehicle 1 may be pressed by a foot of a user, two feet of the user, a cargo, and the like. Therefore, the type of pressure can include a foot type, a feet type, and a cargo type.

As shown in FIG. 6A, when a user steps one foot on electric vehicle 1, pressure sensor module 12 can detect continuous and uneven pressure on only a portion of the surface of main body 11. As shown in FIG. 6B, when the user steps both feet on electric vehicle 1, pressure sensor module 12 can detect non-continuous and uneven pressure on multiple areas of the surface of main body 11. Further as shown in FIG. 6C, when a cargo is placed on electric vehicle 1, pressure sensor module 12 can detect continuous pressure across multiple areas of the surface of main body 11. Therefore, in some embodiments, if the pressure is continuously distributed across a plurality of areas on electric vehicle 1, the type of pressure can be determined as the cargo type, and if the pressure is non-continuously distributed across the plurality of areas on electric vehicle 1, the type of pressure can be determined as the feet type (i.e., two feet onboard). In some embodiments, pressure sensor module 12 may distinguish a foot and a cargo based on whether the generated pressure is uneven. For example, as shown in FIG. 6A, areas 601 and 603 are directly under the foot, thereby sensing greater pressure than other areas, such as area 605. Moreover, as shown in FIG. 6C, the pressure generated by a cargo can be even. Therefore, if continuous pressure is uneven, electric vehicle 1 can determine that the subject is a foot; and if continuous pressure is even, electric vehicle 1 can determine that the subject is a cargo.

With reference back to FIG. 5, in step 503, electric vehicle 1 receives remote instructions from a remote controller. As discussed above, a control mode of electric vehicle 1 can include a posture control mode and a remote control mode.

Accordingly, the received remote instructions can include an instruction for selecting a control mode for electric vehicle 1. For example, the received remote instructions can include an instruction for selecting the posture control mode or an instruction for selecting the remote control mode. It is appreciated that, other than instruction for selecting the control mode, the remote instructions can also include instructions for turning on/off electric vehicle 1, locking electric vehicle 1, setting a maximum speed of electric vehicle 1, and the like.

In step 505, electric vehicle 1 operates at least one electric motorized wheel 14 of electric vehicle 1 in a control mode based on at least one of the pressure and the remote instructions. The control mode can be determined based on the received instruction for selecting the control mode. For example, in response to receiving the instruction for selecting the posture control mode, electric motorized wheel 14 of electric vehicle 1 can be operated in the posture control mode. And in response to receiving the instruction for selecting the remote control mode, electric motorized wheel 14 of electric vehicle 1 can be operated in the remote control mode.

Details of the posture control mode and the remote control mode will be further described as below.

In the posture control mode, a pressure indication of a user can be determined based on the detected pressure. As described above, referring to FIGS. 2A-2B and FIGS. 3A-3C, the user's pressure indication can be determined, and the pressure indication can include at least one of "forward," "backward," "left," and "right." If the pressure indication is "forward," electric motorized wheel 14 is accelerated to move electric vehicle 1 forward. If the pressure indication is "backward," electric motorized wheel 14 is decelerated to slow down electric vehicle 1. If the pressure indication is "left," electric motorized wheel 14 is adjusted to cause electric vehicle 1 to turn left. Similarly, if the pressure indication is "right," electric motorized wheel 14 is adjusted to cause electric vehicle 1 to turn right. As discussed above, the course of electric vehicle 1 can be adjusted by driving wheels at two sides of electric vehicle 1 at different speeds. When central control unit 13 determines that the user pressing to the left, it may instruct at least one electric motorized wheel 14 to adjust its speeds and generate a speed difference between the left side and right side of electric vehicle 1. For example, when electric vehicle 1 has an electric motorized wheel 14 on the left side and an electric motorized wheel 14 on the right side, the speed of the left-side wheel can be made slower than that of the right-side wheel such that the speed difference causes the vehicle to turn left. When central control unit 13 determines that the user is pressing to the right, it may adjust the speed of at least one electric motorized wheel to make the right-side wheel slower than the left-side wheel, so as to cause the vehicle to turn right. In some embodiments, the vehicle may be provided with other control mechanism(s) to slow down or speed up, to move backward or forward, and/or to turn left or right.

In the remote control mode, electric vehicle 1 can be controlled by remote controller 400. It is appreciated that, in the remote control mode, pressure sensor module 12 may keep operating. In the remote control mode, the communication session between electric vehicle 1 and remote controller 400 is kept active to ensure that electric vehicle 1 is under the control of remote controller 400. For example, remote controller 400 can send a heartbeat signal to electric vehicle 1 regularly (e.g., one or two seconds). If electric vehicle 1 fails to receive the heartbeat signal for longer than a predetermined period, electric vehicle 1 may determine that the communication session has failed, and switch from the remote control mode to the posture control mode.

As discussed above, remote controller 400 can include a plurality of buttons to generate one or more remote instructions, such as turning on/off electric vehicle 1, moving forward/speeding up, moving backward/slowing down, turning left, turning right, locking down, auto-follow, switching mode, or the like. Other than generating remote instructions by pressing buttons, remote controller 400 can further include a sensor (e.g., gyroscope or other types of inertial measurement units) for detecting an attitude of remote controller 400. Remote controller 400 may generate control signals according to the detected attitude and send the control signals to electric vehicle 1. The remote control based on an attitude is described in more detail below.

Figure 7A:
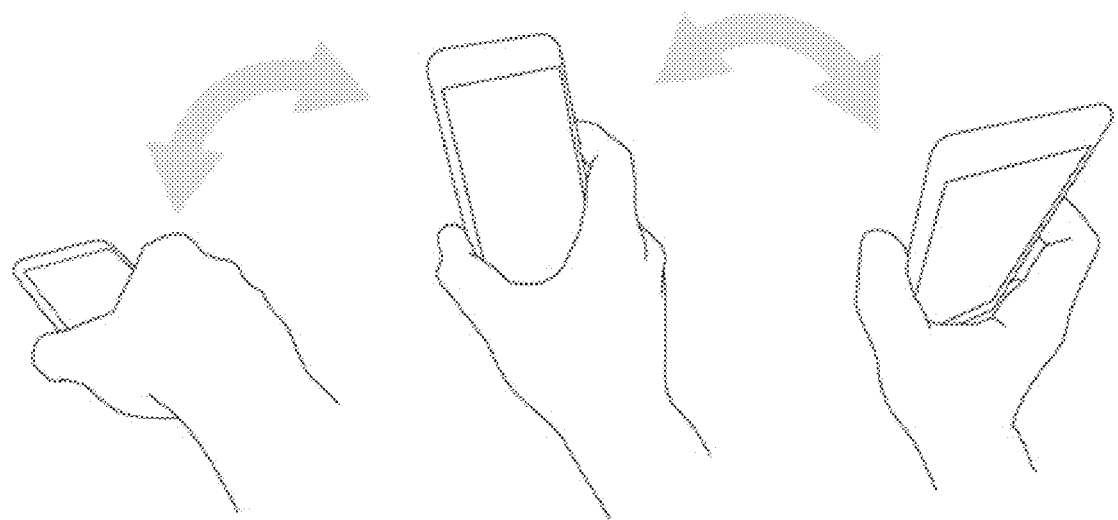
FIGS. 7A and 7B illustrate exemplary operations of the remote controller, consistent with embodiments of the present disclosure.
Figure 7B:
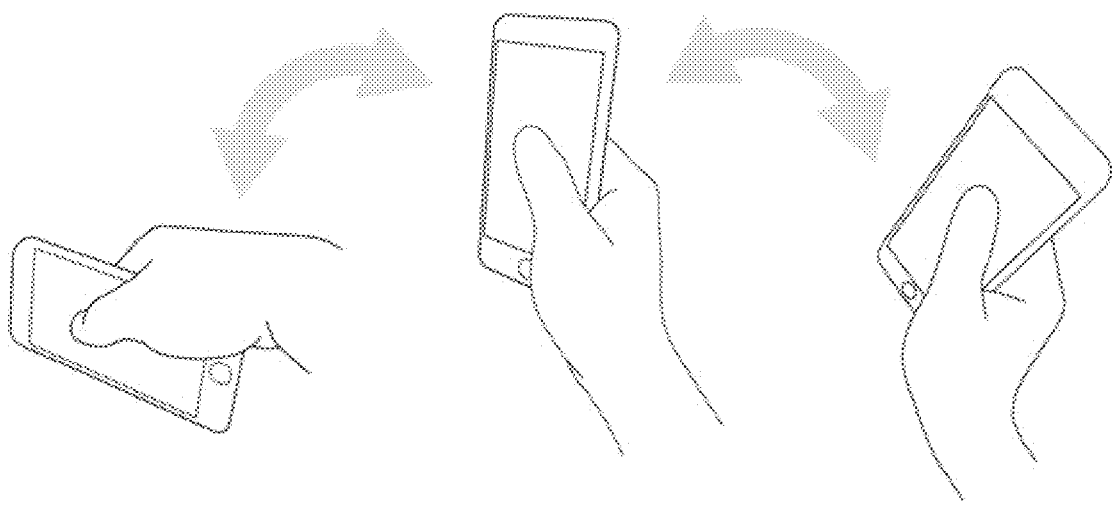

FIGS. 7A and 7B are schematic diagrams illustrating exemplary operations of remote controller 400, according to exemplary embodiments of the disclosure.

In some embodiments, the attitude of remote controller 400 can be "leaning forward," "leaning backward," "leaning left," and "leaning right." As shown in FIG. 7A, remote controller 400 can be tilted forward and backward by a user to assume different attitudes. Based on the attitude of remote controller 400, at least one electric motorized wheel 14 can be accelerated to move electric vehicle 1 forward if the attitude is "leaning forward," and at least one electric motorized wheel 14 can be decelerated to move electric vehicle 1 backward if the attitude is "leaning backward." Similarly, as shown in FIG. 7B, remote controller 400 can be tilted left and right by the user to generate different attitudes. Based on the attitude of remote controller 400, speed of at least one electric motorized wheel 14 can be adjusted to cause electric vehicle 1 to turn left if the attitude is "leaning left," and the speed of at least one electric motorized wheel 14 can be adjusted to cause electric vehicle 1 to turn right if the attitude is "leaning right."

When electric vehicle 1 is controlled based on attitudes of remote controller 400, certain safety features may be implemented to prevent misoperation of remote controller 400 from causing unexpected movement of electric vehicle 1. For example, if the user only steps one foot on electric vehicle 1, any change of the attitude of remote controller 400 could cause a sudden movement change of electric vehicle 1 and thus cause the user to lose balance. Thus, misoperation of remote controller 400 could put the user in danger. Therefore, in some embodiments, when an inactive electric vehicle 1 receives an instruction from remote controller 400 to change a moving state of electric vehicle 1, electric vehicle 1 may determine whether both feet of a user has stepped on electric vehicle 1. Only If both feet of the user are on electric vehicle 1, electric vehicle 1 will operate electric motorized wheel 14 according to the received remote instruction.

In some embodiments, it may be unsafe when electric vehicle 1 moves backward, as the user may fall from electric vehicle 1. Therefore, if a user is standing on electric vehicle 1 (e.g., the type of pressure is the feet type as shown in FIG. 6B), electric vehicle 1 can be slowed down to full stop according to a remote instruction for moving back electric vehicle 1. Therefore, though electric vehicle 1 can keep receiving the remote instruction for moving back, electric vehicle 1 can be stationary when a user stands on it, so that the safety of the user can be ensured. In contrast, if the type of pressure is the cargo type, electric vehicle 1 can be allowed to move backward and accelerate backward according to the remote instruction for moving back electric vehicle 1. As such, electric vehicle 1 can operate freely according to the remote instruction, so that the cargo can be carried to a designated place as instructed. In some embodiments, when the detected pressure is lower than a predetermined threshold, electric vehicle 1 can also be allowed to move backward and accelerate backward according to the remote instruction for moving back electric vehicle 1.

Furthermore, in some embodiments, electric vehicle 1 can be locked only if the pressure on electric vehicle 1 is less than a predetermined threshold or electric vehicle 1 determines no human is standing on it. Therefore, even if a user who is currently riding electric vehicle 1 presses "Lock Down" button 405 by accident, electric vehicle 1 will not be locked. Thus, the safety of the user may be protected.

Furthermore, if the user on electric vehicle 1 jumps off, electric vehicle 1 can slow down to full stop. For example, if the pressure becomes lower than a predetermined value, it can be determined that the user has jumped off electric vehicle 1 and electric vehicle 1 can slow to full stop. In some embodiments, electric vehicle 1 can lock itself after slowing down to full stop.

Similarly, in some embodiments, remote controller 400 may further include a memory for storing information associated with the user. For example, the information may include height, weight, age, or the like. The information may be entered by the user, or acquired from other sources (e.g., a health database). Limitations for controlling electric vehicle 1 may be generated based on the information. For example, if the age of the user is under 14, the speed of electric vehicle 1 may be set not to exceed 50% of the maximum speed.

Figure 8:
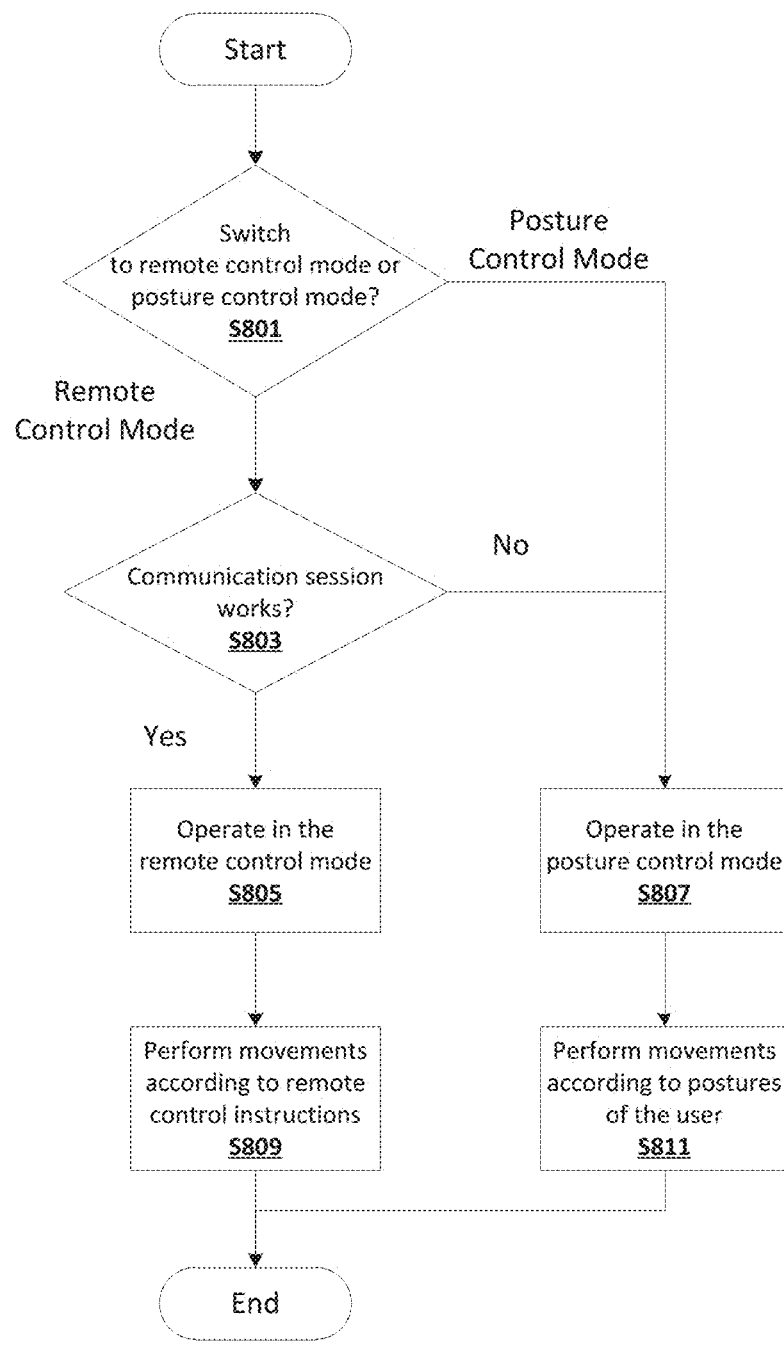
FIG. 8 is a flowchart of an exemplary process for determining a control mode of the electric vehicle, consistent with embodiments of the present disclosure.

In some embodiments, electric vehicle 1 can allow the user to switch between the posture control mode and the remote control mode. For example, electric vehicle 1 can switch from the posture control mode to the remote control mode, or switch from the remote control mode to the posture control mode. FIG. 8 is a flowchart of an exemplary process 800 for determining a control mode of electric vehicle 1, according to some embodiments of the disclosure. Process 800 can include steps S801-S811.

In step S801, electric vehicle 1 receives an instruction for switching a control mode and determines if the control mode is being switched to the remote control mode or posture control mode. As discussed above, referring to FIG. 4, "Switch Mode" button 407 can be used to switch the control mode between the remote control mode and the posture control mode for electric vehicle 1. For example, if electric vehicle 1 is operating in the remote control mode, the control mode can be switched to posture control mode by pressing button 407. If electric vehicle 1 is operating in the posture control mode, the control mode can be switched to remote control mode by pressing button 407. It is appreciated that when electric vehicle 1 is started, it may automatically enter a default initial control mode. The initial control mode can be the remote control mode or the posture control mode. Therefore, in some embodiments, electric vehicle 1 can be in the posture control mode or the remote control by default unless it receives instructions to switch otherwise.

If, in step S801, electric vehicle 1 determines that the control mode is being switched to the posture control mode, process 800 proceeds to step S809. If electric vehicle 1 determines that the control mode is being switched to the remote control mode, process 800 proceeds to step S803.

In step S803, electric vehicle 1 determines whether a communication session between electric vehicle 1 and remote controller 400 functions normally. As discussed above, communication interface 132 of electric vehicle 1 can establish the communication session with remote controller 400. If the communication session fails, remote controller 400 cannot control electric vehicle 1, and electric vehicle 1 and/or remote controller 400 may generate an alert to inform the user about the failure. In one embodiment, a beeper of electric vehicle 1 may generate a sharp sound that lasts, for example, 2 seconds. In another embodiment, an indicator light on electric vehicle 1 or remote controller 400 may twinkle to alert the user.

Various reasons may cause the communication session to fail. For example, the reasons may include electric vehicle 1 and remote controller 400 being separated too far away from each other to maintain the communication session, remote controller 400 or communication interface 132 failing to operate properly, or the like. In some embodiments, remote controller 400 may periodically perform a self-diagnosis and transmit to electric vehicle 1 a heartbeat signal indicating remote controller 400 is working well. Electric vehicle 1 may determine that remote controller 400 is in a good condition based on the received heartbeat signal. It is appreciated that the communication session can be checked during the remote control mode, periodically or non-periodically.

If, in step S803, electric vehicle 1 determines that the communication session works, process 800 proceeds to step S805. If electric vehicle 1 determines that the communication session does not work, process 800 proceeds to step S809.

In step S805, in response to a determination that the communication session working, electric vehicle 1 starts to operate in the remote control mode.

In step S807, electric vehicle 1 receives remote control instructions generated by remote controller 400, and performs movements according to the remote control instructions.

As discussed above, when the control mode is switched to the posture control mode or the communication session does not work anymore in the remote control mode, process 800 proceeds to step S809.

In step S809, electric vehicle 1 operates in the posture control mode according to the instruction for switching to the posture control mode. It is appreciated that the instruction for switching to the posture control mode can be generated from the user (e.g., pressing "Switch Mode" button 407) or the failure of the communication session. In some embodiments, in response to switching from the remote control mode to the posture control mode, electric vehicle 1 determines the current posture as a reference, and determines real-time pressure indication of a user based on detected real-time pressure and the reference in the posture control mode. In some embodiments, when the control mode is being switched to the posture control mode, electric vehicle 1 can detect a reference pressure associated with the user's posture. The reference pressure can be used to determine the real-time pressure indication in the posture control mode. Electric vehicle 1 can detect a current pressure in the posture control mode, and a change between the reference pressure and the current pressure can be used to determine the real-time pressure indication. That is, the change of the pressure on electric vehicle 1 can be associated with the real-time pressure indication, instead of an absolute value of the pressure. For example, when a user standing on electric vehicle 1 lowers the pressure generated by the user's front foot, a change of the pressure can instruct electric vehicle 1 slow down even though the user is still leaning forward. Therefore, the user does not have adjust his/her gesture too much and the safety of the user can be ensured.

In step S811, electric vehicle 1 receives the user's pressure indication generated based on pressure information. The pressure information may be detected by pressure sensor module 12 of electric vehicle 1. Movements may be performed according to the pressure indication.

Detail of the remote control mode and the posture control mode has been discussed above and the description thereof will be omitted herein for clarity.

Thus, electric vehicle 1 according to embodiments of the disclosure may operate in two control modes. In the posture control mode, electric vehicle 1 may be controlled more intuitionally. In the remote control mode, electric vehicle 1 may be used to carry cargos. And the posture control mode and the remote control mode may be switched automatically or at the user's will.

Embodiments of the disclosure further provide a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

The above description and accompanying drawings that illustrate exemplary embodiments should not be taken as limiting. Various mechanical, compositional, structural, chemical, electrical, and operational changes may be made without departing from the scope of this description and the claims, including equivalents. In some instances, well-known structures and techniques have not been shown or described in detail so as not to obscure the disclosure. Those having ordinary skill in the art and access to the teachings provided herein will recognize additional modifications, applications, embodiments, and substitution of equivalents that all fall with the scope of the present disclosure.

Moreover, those skilled in the art will appreciate that the conception upon which this disclosure is based may readily be used as a basis for designing other structures, methods, and systems for carrying out the several purposes of the present disclosure. Accordingly, the enclosed claims are not to be considered as limited by the foregoing description.

What is claimed is:

1. An electric vehicle, comprising:
   at least one electric motorized wheel to drive the electric vehicle;
   a pressure sensor module configured to detect pressure on the electric vehicle;
   a communication interface configured to receive remote instructions from a remote controller, wherein the remote controller comprises a gyroscope configured to detect an attitude of the remote controller; and
   a central controller configured to operate the at least one electric motorized wheel in a control mode based on at least one of the received remote instructions and the pressure, wherein
   the control mode includes at least one of a posture control mode and a remote control mode, and in the remote control mode, the central controller is further configured to:
   determine whether a heartbeat signal is received from the remote controller within a predetermined period; and
   in response to failing to receive the heartbeat signal within the predetermined period, switch from the remote control mode to the posture control mode.

2. The electric vehicle of claim 1, wherein the central controller is further configured to:
   in response to the detected pressure being greater than a predetermined value, determine a type of the pressure, wherein
   the type of the pressure includes at least one of a foot type, a feet type, and a cargo type.

3. The electric vehicle of claim 2, wherein, the central controller is further configured to:
   determine a distribution of the pressure on the electric vehicle;
   in response to the distribution being uneven across a first set of areas on the electric vehicle, determine the type of the pressure as the foot type;
   in response to the distribution being non-continuous and uneven across a second set of areas on the electric vehicle, determine the type of the pressure as the feet type; and
   in response to the distribution being continuous and even across a third set of areas on the electric vehicle, determine the type of the pressure as the cargo type.

4. The electric vehicle of claim 3, wherein the remote instructions include an instruction for selecting the posture control mode and an instruction for selecting the remote control mode, and the central controller is further configured to:
   in response to receiving the instruction for selecting the posture control mode, operate the at least one electric motorized wheel in the posture control mode; and
   in response to receiving the instruction for selecting the remote control mode, operate the at least one electric motorized wheel in the remote control mode.

5. The electric vehicle of claim 3, wherein, in the posture control mode, the central controller is further configured to:
   determine pressure indication of a user based on the detected pressure, wherein the pressure indication includes at least one of forward, backward, left, and right;
   accelerate the at least one electric motorized wheel to move the electric vehicle forward, in response to the pressure indication being forward;
   decelerate the at least one electric motorized wheel to slow down the electric vehicle, in response to the pressure indication being backward;
   adjust speed of the at least one electric motorized wheel to cause the electric vehicle to turn left, in response to the pressure indication being left; and
   adjust speed of the at least one electric motorized wheel to cause the electric vehicle to turn right, in response to the pressure indication being right.

6. The electric vehicle of claim 5, wherein the central controller is further configured to:
   when the electric vehicle is switched from the remote control mode to the posture control mode, determine a current posture as a reference; and
   determine the pressure indication of a user based on the detected pressure and the reference in the posture control mode.

7. The electric vehicle of claim 5, wherein the at least one electric motorized wheel includes a left wheel and a right wheel, and the central controller is further configured to:
   in response to the pressure indication being left, cause speed of the left wheel to be faster than speed of the right wheel; and in response to the pressure indication being right, cause the speed of the right wheel to be faster than the speed of the left wheel.

8. The electric vehicle of claim 3, wherein, in the remote control mode, the central controller is further configured to:
in response to the type of pressure being the feet type or the cargo type, activate the at least one electric motorized wheel to operate according to the received remote instructions.

9. The electric vehicle of claim 8, wherein the central controller is further configured to:
in response to the type of pressure being the feet type, slow down and stop the electric vehicle according to a remote instruction for moving back the electric vehicle; and
in response to the type of the pressure being the cargo type, allow the electric vehicle to move backward according to the remote instruction for moving back the electric vehicle.

10. The electric vehicle of claim 8, wherein, in the remote control mode, the central controller is further configured to:
in response to the pressure becoming lower than the predetermined value, slow down and stop the electric vehicle.

11. The electric vehicle of claim 1, wherein, in the remote control mode, the central controller is further configured to:
accelerate the at least one electric motorized wheel to move the electric vehicle forward, in response to the attitude being leaning forward;
decelerate the at least one electric motorized wheel to slow down the electric vehicle, in response to the attitude being leaning backward;
adjust speed of the at least one electric motorized wheel to cause the electric vehicle to turn left, in response to the attitude being leaning left; and
adjust speed of the at least one electric motorized wheel to cause the electric vehicle to turn right, in response to the attitude being leaning right.

12. The electric vehicle of claim 1, wherein the remote controller comprises a display interface, wherein the display interface includes a slide bar for adjusting a maximum speed of the electric vehicle.

13. A method for controlling an electric vehicle including at least one electric motorized wheel, comprising:
detecting pressure on the electric vehicle;
receiving remote instructions from a remote controller, wherein the remote controller comprises a gyroscope configured to detect an attitude of the remote controller; and
operating the at least one electric motorized wheel in a control mode based on at least one of the received remote instructions and the pressure, wherein
the control mode includes at least one of a posture control mode and a remote control mode, and in the remote control mode, the method further comprises:
determining whether a heartbeat signal is received from the remote controller within a predetermined period; and
in response to failing to receive the heartbeat signal within the predetermined period, switching from the remote control mode to the posture control mode.

14. The method of claim 13, further comprising:
in response to the detected pressure being greater than a predetermined value, determining a type of the pressure, wherein
the type of the pressure is at least one of a foot type, a feet type, and a cargo type.

15. The method of claim 14, further comprising:
determining a distribution of the pressure on the electric vehicle;
in response to the distribution being uneven across a first set of areas on the electric vehicle, determining the type of the pressure as the foot type;
in response to the distribution being non-continuous and uneven across a second set of areas on the electric vehicle, determining the type of the pressure as the feet type; and
in response to the distribution being continuous and even across a third of areas on the electric vehicle, determining the type of the pressure as the cargo type.

16. The method of claim 15, wherein the remote instructions include an instruction for selecting the posture control mode and an instruction for selecting the remote control mode, and the method further comprises:
in response to receiving the instruction for selecting the posture control mode, operating the at least one electric motorized wheel in the posture control mode; and
in response to receiving the instruction for selecting the remote control mode, operating the at least one electric motorized wheel in the remote control mode.

17. The method of claim 15, wherein, in the posture control mode, the method further comprises:
determining pressure indication of a user based on the detected pressure, wherein the pressure indication includes at least one of forward, backward, left, and right;
accelerating the at least one electric motorized wheel to move the electric vehicle forward, in response to the pressure indication being forward;
decelerating the at least one electric motorized wheel to slow down the electric vehicle, in response to the pressure indication being backward;
adjusting speed of the at least one electric motorized wheel to cause the electric vehicle to turn left, in response to the pressure indication being left; and
adjusting speed of the at least one electric motorized wheel to cause the electric vehicle to turn right, in response to the pressure indication being right.

18. The method of claim 17, further comprising:
when the electric vehicle is switched from the remote control mode to the posture control mode, determining a current posture as a reference; and
determining the pressure indication of a user based on the detected pressure and the reference in the posture control mode.

19. The method of claim 17, wherein the at least one electric motorized wheel includes a left wheel and a right wheel, and the method further comprises:
in response to the pressure indication being left, causing the speed of the left wheel to be faster than the speed of the right wheel; and
in response to the pressure indication being right, causing the speed of the right wheel to be faster than the speed of the left wheel.

20. The method of claim 15, further comprising:
detecting an attitude of the remote controller.

21. The method of claim 20, wherein, in the remote control mode, the method further comprises:
accelerating the at least one electric motorized wheel to move the electric vehicle forward, in response to the attitude being leaning forward;
decelerating the at least one electric motorized wheel to slow down the electric vehicle, in response to the attitude being leaning backward;

adjusting speed of the at least one electric motorized wheel to cause the electric vehicle to turn left, in response to the attitude being leaning left; and adjusting speed of the at least one electric motorized wheel to cause the electric vehicle to turn right, in response to the attitude being leaning right.

22. The method of claim 15, wherein, in the remote control mode, the method further comprises:

in response to both feet of the user being on the electric vehicle, activating the at least one electric motorized wheel to operate according to the received remote instructions.

23. The method of claim 22, further comprising:

in response to the type of pressure being the foot type, slowing down and stopping the electric vehicle according to a remote instruction for moving back the electric vehicle; and in response to the type of pressure being the cargo type, allowing the electric vehicle to move backward according to the remote instruction for moving back the electric vehicle.

24. The method of claim 22, wherein, in the remote control mode, the method further comprises:

in response to the pressure becoming lower than the predetermined value, slowing down and stopping the electric vehicle.

25. A non-transitory computer-readable medium that stores a set of instructions, when executed by at least one processor of an electronic device, cause the electronic device to perform a method for controlling an electric vehicle including at least one electric motorized wheel, the method comprising:

detecting pressure on the electric vehicle;

receiving remote instructions from a remote controller, wherein the remote controller comprises a gyroscope configured to detect an attitude of the remote controller; and operating the at least one electric motorized wheel in a control mode based on at least one of the received remote instructions and the pressure, wherein the control mode includes at least one of a posture control mode and a remote control mode, and in the remote control mode, the method further comprises:

determining whether a heartbeat signal is received from the remote controller within a predetermined period; and in response to failing to receive the heartbeat signal within the predetermined period, switching from the remote control mode to the posture control mode.

* * * * *